United States Patent [19]

Walker et al.

[11] Patent Number: 5,263,312
[45] Date of Patent: Nov. 23, 1993

[54] TUBE FITTING FOR A GAS TURBINE ENGINE

[75] Inventors: Alan Walker, Wyoming; Christopher C. Glynn, Hamilton; Jeffrey Glover, Cincinnati, all of Ohio

[73] Assignee: General Electric Company, Cincinnati, Ohio

[21] Appl. No.: 917,558

[22] Filed: Jul. 21, 1992

[51] Int. Cl.[5] .................................... F02C 7/20
[52] U.S. Cl. ........................ 60/39.31; 60/39.099; 285/13; 285/334.4
[58] Field of Search .............. 60/734, 39.094, 39.31; 285/381, 13, 14, 92, 334.4

[56] References Cited

U.S. PATENT DOCUMENTS

| | | | |
|---|---|---|---|
| 4,185,462 | 1/1980 | Morse | 60/39.094 |
| 5,094,480 | 3/1992 | Boileau | 285/14 |
| 5,098,133 | 3/1992 | Glover | 285/23 |

FOREIGN PATENT DOCUMENTS 432013A  6/1991  European Pat. Off. ......... 285/334.4

Primary Examiner—Richard A. Bertsch
Assistant Examiner—William Wicker
Attorney, Agent, or Firm—Jerome C. Squillaro

[57] ABSTRACT

A tube fitting for use with a flammable fluid is disposed in an auto-ignition zone of a gas turbine engine. The tube fitting has a pair of separable casings defining a passage to accommodate flow therethrough of the flammable fluid, and the casings have a pair of seals associated in sealing engagement with each other to seal about the passage. A restriction is arranged in one of the casings for limiting at least to a preselected flow rate any leakage flow of the flammable fluid from the passage past the seals upon an interruption in the sealing engagement thereof in the event of the occurrence of the separation of the casing.

16 Claims, 3 Drawing Sheets

TUBE FITTING FOR A GAS TURBINE ENGINE

CROSS-REFERENCE TO RELATED APPLICATIONS

Reference is hereby made to the following copending U.S. patent applications dealing with related subject matter and assigned to the assignee of the present invention: Ser. No. 07/783,601 filed Oct. 28, 1991 and Ser. No. 07/836,494 filed Feb. 18, 1992.

FIELD OF THE INVENTION

This invention relates in general to gas turbine engines for aircraft and in particular to tube fittings as may be utilized in an auto-ignition zone of a gas turbine engine for interconnecting tubing or other components of the gas turbine engine carrying a flammable fluid thereto.

BACKGROUND OF THE INVENTION

In the past, various different types of tube fittings were arranged in an auto-ignition zone of a gas turbine engine for aircraft to interconnect tubing or other components conveying a flammable fluid adapted for combustion to drive the gas turbine engine. It is believed that the potential existed for uncontrolled leakage of the flammable fluid from such past tube fittings into the auto-ignition zone of the gas turbine engine which may have caused a fire or loss of power therein resulting in an undesirable In Flight Shutdown (IFSD) of the gas turbine engine.

At least one of the previous schemes for resolving the aforementioned uncontrolled leakage flow of flammable fluid from the past tube fittings was to contain such leakage flow and convey it away from the auto-ignition zone of the gas turbine engine. The aforementioned previous scheme utilized shrouds in association with the past tube fittings to collect the leakage flow of the flammable fluid thereby to isolate such leakage flow from the auto-ignition zone of the gas turbine engine, and drain tubes connected with the shrouds conveyed such leakage flow away from the auto-ignition zone into a non-ignition zone of the gas turbine engine. Thus, the conveyance of the leakage flow of flammable fluid away from the auto-ignition zone obviated the combustion therein of such leakage flow of flammable fluid.

While the above discussed past scheme undoubtedly had many salient features, some of the disadvantageous or undesirable features thereof are believed to be that the shrouds and drain tubes not only added to the complexity of the gas turbine engine construction thereby to increase maintenance time but also added to the weight of the gas turbine engine. At least another disadvantageous feature of the above discussed past scheme is believed to be that the shrouds and drain lines did not limit the rate of the leakage flow of flammable fluid from the past tube fittings, and such leakage flow may have become excessive.

SUMMARY OF THE INVENTION

Among the several objects of the present invention may be noted the provision of an improved tube fitting for use with a flammable fluid in an auto-ignition zone of a gas turbine engine which overcomes the above discussed disadvantageous or undesirable features, as well as others, of the prior art; the provision of such improved tube fitting which predeterminately limits to a preselected flow rate the leakage flow of the flammable fluid into the auto-ignition zone of the gas turbine engine; the provision of such improved tube fitting have visual means for indicating the occurrence of such leakage flow which is readily observable during an under-cowl inspection of the gas turbine engine; and the provision of such improved tube fitting have component parts which are simplistic in design, easily assembled and economically manufactured. These as well as other objects and advantageous features of the present invention will be in part apparent and in part pointed out hereinafter.

In general and in one form of the invention, a tube fitting for a flammable fluid is adapted for disposition in an auto-ignition zone of a gas turbine engine. The tube fitting has a plurality of separable casing means releasably secured together in assembly positions for defining a passage through the tube fitting to accommodate flow therethrough of the flammable fluid, and some of the separable casing means respectively include a pair of seal means for sealing engagement with each other about said passage. At least the some separable casing means include means for predeterminately limiting the rate of any leakage flow of the flammable fluid from the passage past the seal means upon an interruption in the sealing engagement thereof in the event of the occurrence of a separation of the casing means from their assembly positions.

The exemplifications set out herein illustrate preferred embodiments of the present invention in one form thereof, and such exemplifications are not to be construed as limiting either the scope of the present invention or the scope of the disclosure thereof.

DETAILED DESCRIPTION OF THE PREFERRED EMBODIMENTS

Figure 1:
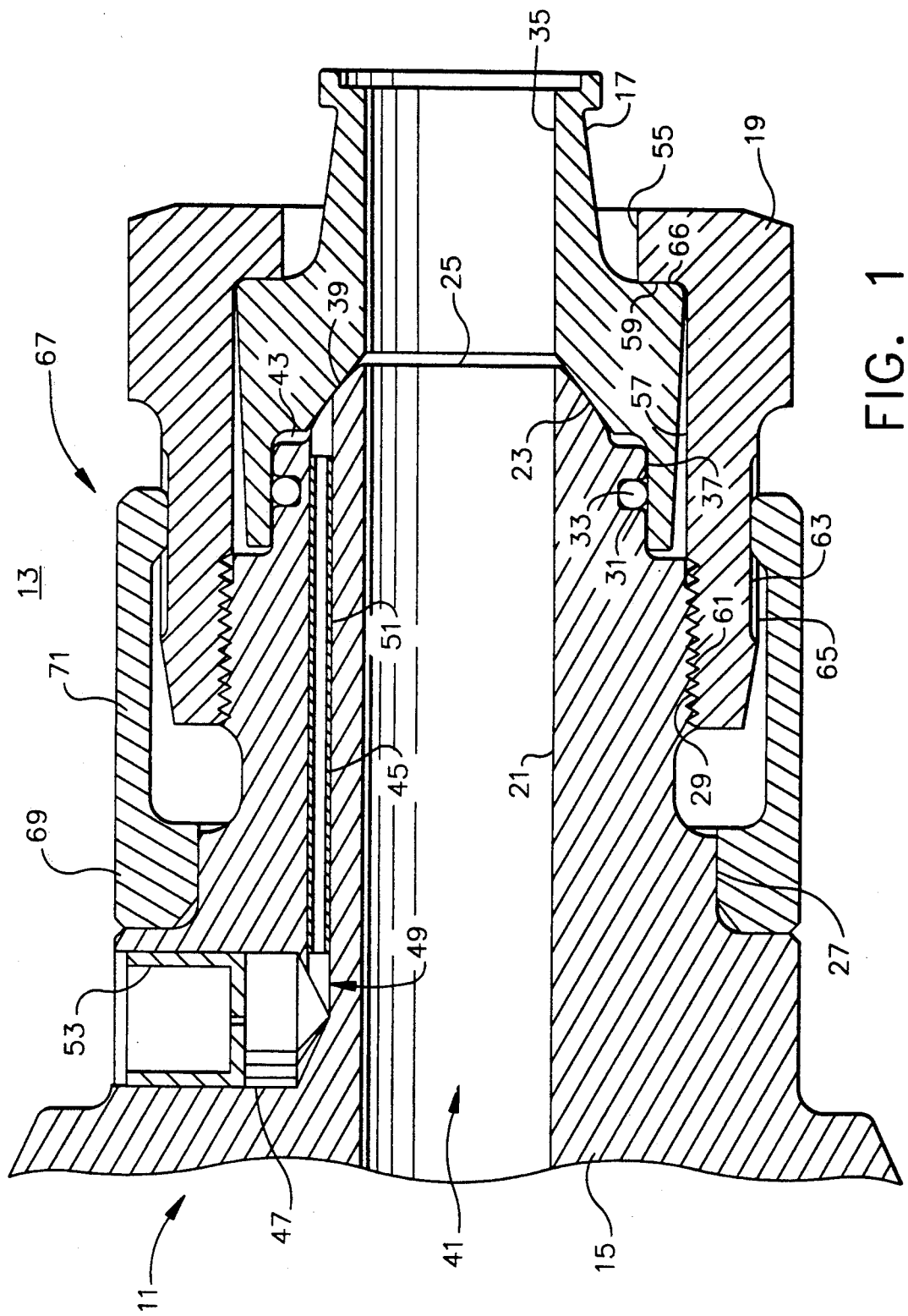
FIG. 1 is a sectional view showing a tube fitting in one form of the invention in cross-section.

Referring now to FIG. 1 in detail, there is shown a tube fitting 11 in one form of the invention which is adapted for use or mounted disposition in an auto-ignition zone 13 of a gas turbine engine (not shown) as may be utilized on aircraft. Albeit not shown for purposes of brevity of disclosure and drawing simplification, a plurality of tube fittings 11, such as for instance as many as thirty (30) or more, may be mounted in auto-ignition zone 13 so as to interconnect tubing and/or other compounds delivering a pressurized flow of a flammable fluid adapted for combustion to drive the gas turbine engine.

Tube fitting 11 is provided with a tube fitting body 15 and a sealing member 17 or the like for instance, and the body and sealing member are releasably secured or retained together against displacement or separation by suitable releasable retaining or securement means, such as a coupling device or B-nut 19 or the like for instance, as discussed in greater detail hereinafter. Body 15, sealing member 17 and B-nut 19, which comprise a plurality or set of casings or casing means, are illustrated in their respective assembly positions in FIG. 1 and may be formed of any suitable material having the required physical characteristics compatible with the flammable fluid to accommodate the pressurized flow thereof.

Body 15 has a generally axial bore 21 therethrough and a seal means, such as a generally spherical seal or sealing surface 23 or the like for instance, is provided on an end portion 25 of the body so as to extend about the bore. A stepped outer circumferential surface 27 on body 15 is arranged generally coaxially with bore 21, and the outer circumferential surface is threaded at 29 and has a generally annular U-shaped groove 31 sealably seating a seal or seal means, such as an O-ring 33 or the like for instance, which is axially spaced between the threads and seal 23.

Sealing member 17 has a pair of stepped bores 35, 37 extending generally coaxially therethrough, and a shoulder interposed between the stepped bores on the sealing member defines a seal means, such as a generally conical seal or sealing surface 39 or the like for instance, shaped for mating sealing engagement with seal 23 on body 15. Thus, when body 15 and sealing member 17 are in their respective assembly positions, smaller stepped bore 35 in the sealing member and bore 21 in the body are arranged generally in axial alignment defining a passage or passage means, indicated generally at 41, for accommodating pressurized flow of the flammable fluid through tube fitting 11, and larger stepped bore 37 in the sealing member is generally coaxially received about a part of circumferential surface 27 on the body in sealing engagement with O-ring seal 33. Furthermore, in the assembly positions of body 15 and sealing member 17, seals 23, 39 are disposed or seated in sealing engagement with each other about flammable fluid passage 41.

A generally annular chamber 43 is defined within body 15 and sealing member 17 and between the respective sealing engagements of seals 23, 39 and larger stepped bore 37 in the sealing member with O-ring 33 in the body, and a pair of cross-passages 45, 47 in the body respectively intersect end portion 25 and circumferential surface 27 of the body thereby to communicate chamber 43 with auto-ignition zone 13 of the gas turbine engine (not shown). Thus, chamber 43 and cross-passages 45, 47 define another passage or passage means 49 for discharging or venting any leakage flow of flammable fluid from the tube fitting 11 into auto-ignition zone 13 of the gas turbine engine, as discussed hereinafter. It may be noted that restriction means, such as a capillary tube 51 and a restriction device or plug 53 or the like for instance, are serially arranged so as to be respectively disposed or mounted within smaller and larger cross-passages 45, 47, and the restrictions of the capillary tube and restriction plug are predeterminately sized to establish a preselected pressure drop in any leakage flow of flammable fluid through chamber 43 and the cross-passages from passage 41 past seals 23, 39 upon an interruption of the sealing engagement or integrity thereof in the event of the occurrence of a separation of body 15 and sealing member 17 from their respective assembly positions. The aforementioned separation of body 15 and sealing member 17 is discussed in greater detail hereinafter.

Even though the leakage flow of flammable fluid is discharged or vented from leakage fluid flow passage 49 directly into auto-ignition zone 13 of the gas turbine engine, it may be noted that the aformentioned preselected pressure drop effected in response to the leakage flow of flammable fluid through capillary tube 51 and restriction plug 53 is great enough to predeterminately limit or restrict the flow rate of such leakage flow to a preselected minimum value below which it is believed that auto-ignition thereof will not occur in auto-ignition zone 13 of the gas turbine engine. The pressure drop created across restriction plug 53 at least assists in the establishment of the aforementioned preselected pressure drop, and it may also be noted that the leakage flow of flammable fluid ejected into auto-ignition zone 13 is in droplet form rather than an atomized spray thereby to further limit the possibility of auto-ignition of the leakage flow in auto-ignition zone 13. While capillary tube 51 and restriction plug 53 are shown in FIG. 1 for establishing the preselected pressure drop in leakage flow passage 49, it is contemplated that only one of such restrictions may be utilized in the leakage flow passage within the scope of the invention.

B-nut 19 has a pair of stepped bores 55, 57 extending generally coaxially therethrough, and an abutment or abutment means, such as a generally annular shoulder 59 or the like for instance is interposed between the stepped bores. Larger stepped bore 57 is in part threaded at 61, and a plurality of generally axially extending slots or positioning grooves 63 are generally radially spaced or arranged about an outer circumferential surface 65 of the B-nut. When body 15, sealing member 17 and B-nut 19 are associated in their respective assembly positions, as shown in FIG. 1, stepped bores 55, 57 of the B-nut extend in part generally coaxially about the body and sealing member with threads or thread means 61 in larger stepped bore 57 of the B-nut being at least in part threadedly engaged with threads or thread means 29 an outer circumferential surface 27 of the body. In response to the above discussed threaded engagement of threads 29, 61, annular abutment 59 on B-nut 19 is engaged with a mating abutment or abutment means 66 on sealing member 17 thereby to releasably urge the sealing member into separable engagement with body 15 and effect the sealing engagement of seals 23, 39 on the body and sealing member, respectively. Thus, B-nut 19 comprises a means releasably engaged with body 15 and sealing member 17 for at least opposing separation thereof in order to maintain the sealing engagement of seals 23, 39 which, of course, obviates the establishment of the above discussed leakage flow of the flammable fluid through leakage flow passage 49.

A locking device or interlocking means 67 for tube fitting 11 may also be formed of the aforementioned any suitable material compatible with the pressurized flammable fluid. Locking device 67 has a generally annular ring 69 shrunk-fit into displacement preventing engagement about outer circumferential surface 27 on body 15, and a plurality of resilient fingers 71 integral with the ring extend generally axially therefrom so as to be respectively received in releasable interlocking engagement with slots 63 in outer circumferential surface 65 of B-nut 19. Thus, the releasable interlocking engagements of finger 71 and slots 63 are intended to releasably retain or at least oppose rotational displacement of B-nut 19 from its assembly position in releasable engagement with body 15 and sealing member 17 in their respective assembly positions. However, tube fitting 11 is subjected to various forces developed by heat, vibration and internal pressurization coincidental with the operation of the gas turbine engine, and such forces may be effective to cause the above discussed rotational displacement of B-nut 19 from its assembly position resulting in the backing-off of the B-nut from its threaded engagement with body 15 so as to interrupt or overcome the releasable interlocking engagements between fingers 71 and slots 63. The aforementioned rotational displacement of B-nut 19 from its assembly position permits the axial displacement or separation of sealing body 17 from its assembly position relative to body 15 thereby to interrupt the sealing engagement of seals 23, 39 and establish leakage flow of the flammable fluid through leakage flow passage 49 in the manner discussed above in detail.

Figure 2:
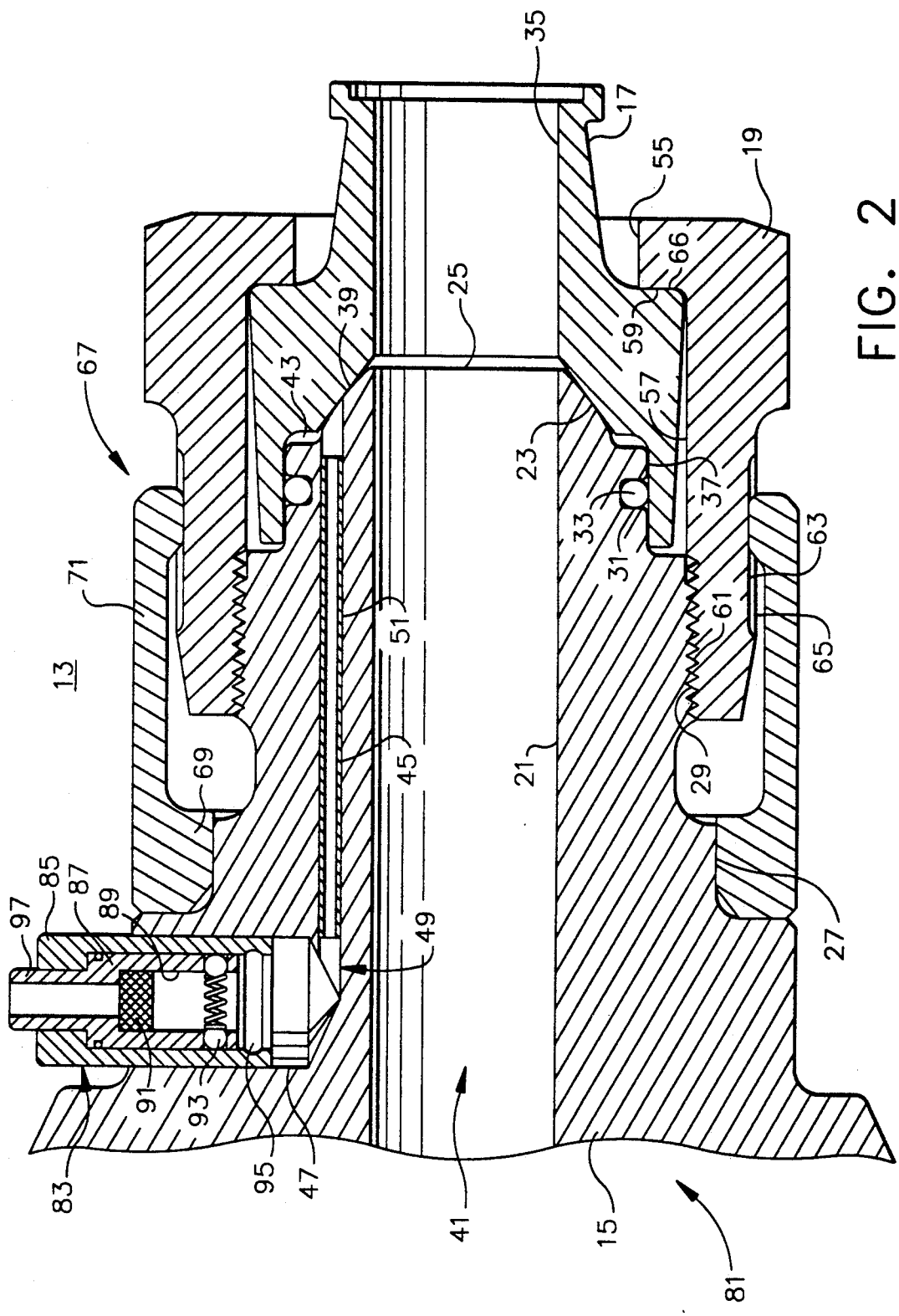
FIG. 2 is a sectional view showing an alternative tube fitting in one form of the invention in cross-section.

In FIG. 2, there is illustrated in one form of the invention an alternative tube fitting 81 having generally the same component parts functioning generally in the same manner as those of the previously described tube fitting 11 with the exceptions noted below.

Restriction plug 53 of tube fitting 11 is replaced in alternative tube fitting 81 by another restriction device or plug 83. Restriction device 83 is provided with a housing 85 mounted by suitable means, such as a press-fit or the like for instance, in cross-passage 47 of body 15, and a stepped piston 87 is slidably and sealably arranged with the housing so as to be movable therein between at-rest and displace positions. Piston 87 has a passage or passage means 89 therethrough forming a part of leakage flow passage 49 and communicating with auto-ignition zone 13 of the gas turbine engine (not shown), and a restriction or restriction means, such as a sintered restrictor 91 or the like for instance, is disposed in passage 89 of piston 87 in series flow arrangement with capillary tube 51. Ball detents 93 carried in piston 87 are resiliently urged into releasable engagement with a groove 95 in housing 85 to define the at-rest position of the piston. In the event of the occurrence of the aforementioned leakage flow in leakage flow passage 49, the previously discussed preselected pressure drop acts across piston 87 moving it to its displaced position into abutting or positioning engagement with housing 85, as shown in FIG. 2. When piston 87 is in its displaced position, it may be noted that a part or stem 97 of the piston extend exteriorly of housing 85 thereby to provide a visual means which is readily observable for indicating during an undercowl inspection of the gas turbine engine that the above discussed leakage flow of flammable fluid in leakage flow passage 49 has occurred. Restriction plug is available as model PLGXO525850A from The Lee Company, Southfield, Mich.

Figure 3:
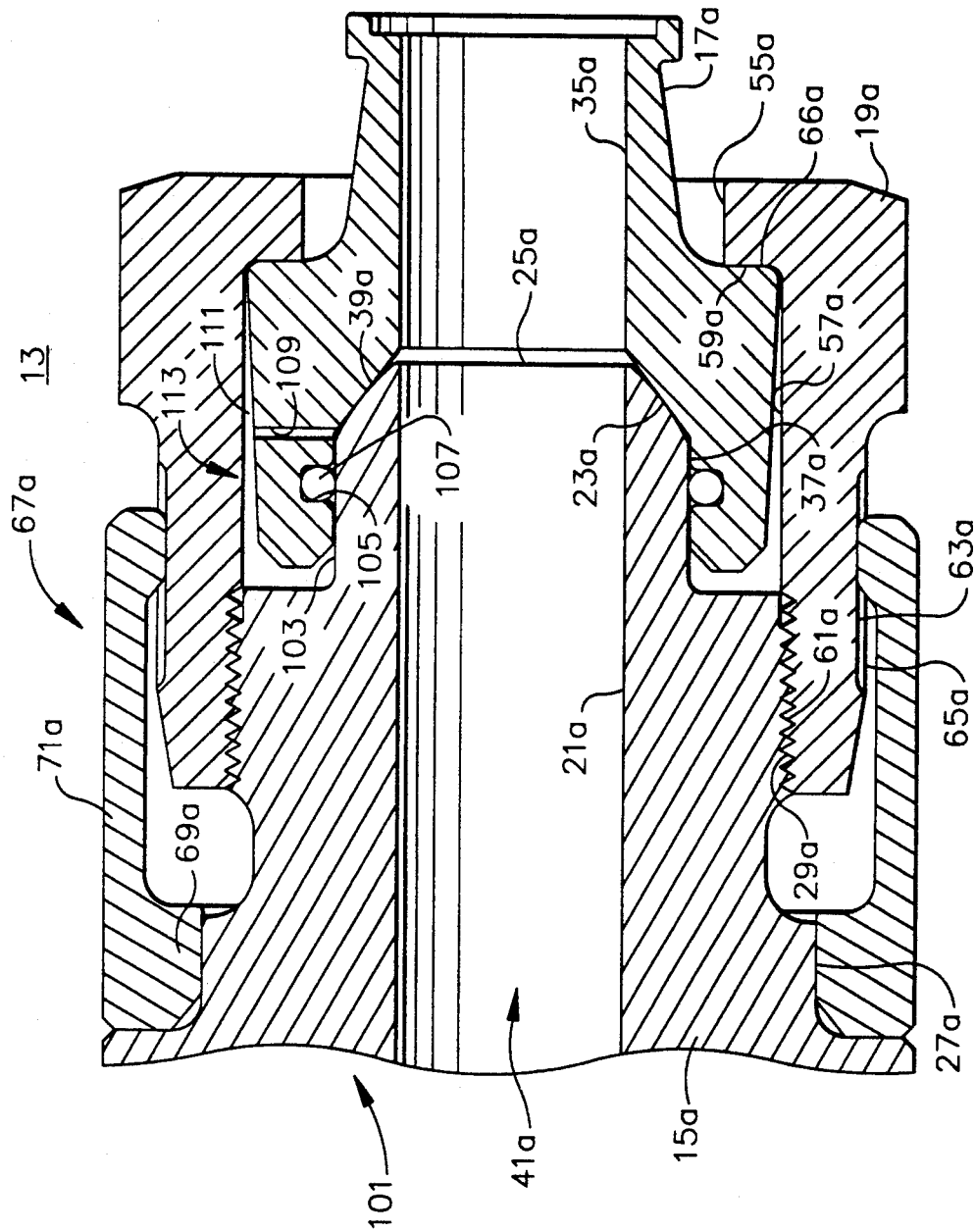
FIG. 3 is a sectional view showing still another alternative tube fitting in one form of the invention in cross-section.

In FIG. 3, another alternative tube fitting 101 in one form of the invention is illustrated having generally the same component parts functioning generally in the same manner as those of the previously described tube fitting 11 with the exceptions noted below, and the component parts of tube fitting 101 comparable to the previously discussed component parts of tube fitting 11 are designated by the letter "a".

Stepped outer circumference 27a on body 15a of tube fitting 101 is threaded in part at 29a and has a generally annular surface 103 extending generally coaxially with bore 21a between threads 29a and seal 23a on end portion 25a of the body.

Larger stepped bore 37a of sealing member 17a is slidably received on annular surface 103 on body 15a, and a generally annular U-shaped groove 105 is provided in the sealing member intersecting with larger stepped bore 37a. A seal or sealing means, such as an O-ring seal 107 or the like for instance, is received in annular groove 105 and arranged in sealing engagement about annular surface 103 on outer circumferential surface 27a of body 15a when the body and sealing member 17a are in their respective assembly positions, as shown in FIG. 3. As discussed in greater detail hereinafter, a passage or passage means, such as a restricted opening 109 or the like for instance, extends generally radially through sealing member 17a intersecting larger stepped bore 37a thereof between O-ring seal 107 and seal 39a of the sealing member; therefore, when body 15a and the sealing member are in their respective assembly positions to effect the sealing engagement of seals 23a, 39a about passage 41a, it may be noted that passage 109 is isolated from passage 41a thereby to interrupt communication between passage 41a, 109.

A generally annular chamber 111 is defined between body 15a, sealing member 17a and B-nut 19a in their respective assembly positions, as shown in FIG. 3. Chamber 111 is arranged for communication with passage 109 in sealing member 17a, and restricted communication is effected between the chamber and auto-ignition zone 13 not only through engaged threads 29a, 61a of body 15a and sealing member 17a but also between the engagement of abutments 59a, 66a on B-nut 19a and sealing member 17a. Thus, passage 109, chamber 111, the engaged threads 29a, 61a, and the abutments 59a, 66a define a leakage flow passage or passage means 113 to accommodate leakage flow of flammable fluid into auto-ignition zone 13 from passage 41a past seals 23a, 39a upon the interruption of the sealing engagement thereof in the event of the occurrence of the separation of body 15a and sealing member 17a from their assembly positions in the manner previously discussed hereinabove.

It may be noted that passage 109 through sealing member 17a is predeterminately sized to define a restriction or restriction means with respect to the leakage flow of flammable fluid through leakage flow passage 113 thereby to establish at least in part the aforementioned preselected pressure drop across or through the leakage flow passage in order to restrict the flow rate of such leakage flow to the aforementioned preselected minimum value below which it si believed that auto-ignition of such leakage flow will not occur in auto-ignition zone 13. It also may be noted that the restrictions or restriction means respectively formed in leakage flow passage 113 by the engagement of threads 29a, 61a and by the engagement of abutments 59a, 66a are each serially arranged with the restriction in leakage flow passage 113 defined by passage 109 in sealing member 17a. Thus, the pressure drops created in response to the leakage or seepage of the leakage flow of flammable fluid into auto-ignition zone 13 through engaged threads 29a, 61a and through engaged abutments 59a, 66a at least assist in the establish of the aforementioned preselected pressure drop across leakage flow passage 113. It may be further noted that the leakage flow of flammable fluid from leakage flow passage 113 into auto-ignition zone 13 is believed to be in droplet form rather than an atomized spray form thereby to further limit the possibility of auto-ignition of the leakage flow in auto-ignition zone 13 and that the sealing engagement of O-ring seal 107 with annular surface 103 on body 15a is effective to ensure the leakage flow of flammable fluid in leakage flow passage 113 passes only through passage 109 in sealing member 17a into chamber 111. To complete the description of tube fitting 101, it is contemplated that less than all of the above discussed restrictions may be utilized in leakage flow passage 113 of tube fitting 101 within the scope of the invention.

We claim:

1. A tube fitting for a flammable fluid and adapted for disposition in an auto-ignition zone of a gas turbine engine, the tube fitting comprising:

a plurality of separable casing means releasably secured together in assembly positions for defining a passage through the tube fitting to accommodate flow therethrough of the flammable fluid, some of said separable casing means respectively including seal means for sealing engagement with each other about said passage, and at least said some separable casing means including means for predeterminately limiting the rate of any leakage flow of the flammable fluid from said passage past said seal means upon an interruption of the sealing engagement thereof in the event of the occurrence of a separation of said casing means from their assembly positions;

wherein said predeterminately limiting means includes passage means interposed between said passage and the auto-ignition zone for accommodating leakage flow of the flammable fluid;

said passage means comprising a pair of cross-passages formed within one of said casing means and a generally annular chamber formed between two of said casing means;

wherein said predeterminately limiting means limits the rate of any leakage flow of the flammable fluid discharging into said auto-ignition zone below a threshold level required to support auto-ignition.

2. The tube fitting as set forth in claim 1 wherein said predeterminately limiting means further includes at least one restriction means in said passage means for establishing a preselected pressure drop in the leakage flow of the flammable fluid through said passage means.

3. The tube fitting as set forth in claim 1 wherein said predeterminately limiting means further includes a plurality of restriction means arranged in said passage means for establishing a preselected pressure drop in the leakage flow of the flammable fluid through said passage means, said plurality of restriction means comprising a capillary tube and a restriction plug, wherein said capillary tube is disposed in a first one of said pair of cross-passages and said restriction plug is disposed in a second one of said pair of cross-passages such that said capillary tube and said restriction plug are in serial flow communication.

4. A tube fitting for a flammable fluid and adapted for disposition in an auto-ignition zone of a gas turbine engine, the tube fitting comprising:

a plurality of separable casing means releasably secured together in assembly positions for defining a passage through the tube fitting to accommodate flow therethrough of the flammable fluid some of said separable casing means respectively including seal means for sealing engagement with each other about said passage, and at least said some separable casing means including means for predeterminately limiting the rate of any leakage flow of the flammable fluid from said passage past said seal means upon an interruption of the sealing engagement thereof in the event of the occurrence of a separation of said casing means from their assembly positions;

wherein said predeterminately limiting means includes passage means interposed between said passage and the auto-ignition zone for accommodating the leakage flow of the flammable fluid;

wherein said predeterminately limiting means further includes at least one restriction means in said passage means for establishing a preselected pressure drop in the leakage flow of the flammable fluid through said passage means;

wherein said predeterminately limiting means further includes visual means movable from an at-rest position within said passage means toward a displaced position extending in part exteriorly of said passage means in response to the establishment of the preselected pressure drop for indicating the occurrence of the leakage flow of the flammable fluid.

5. A tube fitting for a flammable fluid and adapted for disposition on an auto-ignition zone of a gas turbine engine, the tube fitting comprising:

a plurality of separable casings releasably engaged with each other in assembly positions, respectively;

passage means in two of said casings for the flow therethrough of the flammable fluid when said casings are in their assembly positions;

another passage means defined between said casings for communicating said first named passage means with the auto-ignition zone;

a pair of seal means on said two casings and sealably engaged with each other for interrupting communication between said first named and another passage means when said casings are in their respective assembly positions; and at least one restriction means within said another passage means for establishing a preselected pressure drop in any leakage flow of the flammable fluid into the auto-ignition zone through said another passage means from said first named passage means upon an interruption of the sealing engagement between said seal means in the event of the occurrence of a separation of at least said two casings from their respective assembly positions;

wherein one of said two casings includes a pair of coaxial stepped bores and a shoulder interposed between said stepped bores, said shoulder and a larger one of said stepped bores being in sealing engagement with another of said two casings when said casings are in their respective assembly positions.

6. The tube fitting as set forth in claim 5 further comprising interlocking means releasably associated between one of said two casings and another of said casings and operable generally for releasably retaining said casings in their respective assembly positions.

7. The tube fitting as set forth in claim 5 wherein a third one of said casings comprises a coupling device releasably engaged with said two casings for releasably retaining said two casings against separation.

8. The tube fitting as set forth in claim 7 wherein said coupling device and one of said two casings respectively include a pair of thread means for threaded engagement with each other, the threaded engagement of said thread means defining another restriction means communicating with the auto-ignition zone and serially arranged with said at least one restriction means in said another passage means for assisting in the establishment of the preselected pressure drop in the leakage flow of the flammable fluid through said another passage means.

9. The tube fitting as set forth in claim 7 wherein said coupling device and one of said two casings respectively included a pair of abutment means engaged with each other for releasably retaining said two casings against separation, the engagement of said abutment means defining another restriction means communicating with the auto-ignition zone and serially arranged with said at least one restriction means in said another passage means for assisting in the establishment of the preselected pressure drop in the leakage flow of the flammable fluid through said another passage means.

10. A tube fitting for a flammable fluid and adapted for disposition on an auto-ignition zone of a gas turbine engine, the tube fitting comprising:
- a plurality of separable casings releasably engaged with each other in assembly positions, respectively;
- passage means in two of said casings for the flow therethrough of the flammable fluid when said casings are in their assembly positions;
- another passage means defined between said casings for communicating said first named passage means with the auto-ignition zone;
- a pair of seal means on said two casings and sealably engaged with each other for interrupting communication between said first named and another passage means when said casings are in their respective assembly positions; and
- at least one restriction means within said another passage means for establishing a preselected pressure drop in any leakage flow of the flammable fluid into the auto-ignition zone through said another passage means from said first named passage means upon an interruption of the sealing engagement between said seal means in the event of the occurrence of a separation of at least said two casings from their respective assembly positions;
- wherein said another passage means includes a generally annular chamber between said casings, at least another restriction means arranged between one of said two casings and another of said casings for communicating said annular chamber with the auto-ignition zone, and a restricted opening extending radially through said another casing such that said restricted opening communicates between said annular chamber and said seal means, said restricted opening comprising said at least one restriction means.

11. The tube fitting as set forth in claim 10 further comprising sealing means sealably interposed between said two casings for insuring the passage of the leakage flow of the flammable fluid from said first named passage means through said restricted opening into said annular chamber upon the interruption of the sealing engagement between said seal means.

12. A tube fitting for a flammable fluid and adapted for disposition in an auto-ignition zone of a gas turbine engine, the tube fitting comprising:
- a pair of separable casings;
- means releasably engaged with said casings for at least opposing separation thereof;
- passage means in said casings for the flow therethrough of the flammable fluid;
- another passage means in said casings for communicating between said first named passage means and the auto-ignition zone;
- a pair of seal means on said casings for sealing engagement with each other about said first named passage means to interrupt communication between said first named and another passage means; and
- at least one restriction means arranged with said another passage means for establishing a preselected pressure drop in any leakage flow of the flammable fluid through said another passage means from said first named passage means past said seal means upon an interruption in the sealing engagement thereof in the event of the occurrence of a separation between said casings;
- wherein said another passage means includes a generally annular chamber between said casings and communicating with said seal means, and a pair of cross-passages formed within one of said casings communicating said annular chamber with the auto-ignition zone such that any leakage flow of the flammable fluid through said passage means discharges directly into the auto-ignition zone, said at least one restriction means being disposed in either cross-passage.

13. The tube fitting as set forth in claim 12 wherein said at least one restriction means includes a capillary tube disposed in one of said cross-passages.

14. The tube fitting as set forth in claim 12 further comprising another restriction means disposed in the other of said cross-passages for assisting in the establishment of the preselected pressure drop in the leakage flow of the flammable fluid through said another passage means.

15. The tube fitting as set forth in claim 12 further comprising interlocking means releasably associated between one of said casings and said separation opposing means and operable generally for releasably retaining the releasable engagement of said separation opposing means with said casings.

16. A tube fitting for a flammable fluid and adapted for disposition in an auto-ignition zone of a gas turbine engine, the tube fitting comprising:
- a pair of separable casings;
- means releasably engaged with said casings for at least opposing separation thereof;
- passage means in said casings for the flow therethrough of the flammable fluid;
- another passage means in said casings for communicating between said first named passage means and the auto-ignition zone;
- a pair of seal means on said casings for sealing engagement with each other about said first named passage means to interrupt communication between said first named and another passage means; and
- at least one restriction means arranged with said another passage means for establishing a preselected pressure drop in any leakage flow of the flammable fluid through said another passage means from said first named passage means past said seal means upon an interruption in the sealing engagement thereof in the event of the occurrence of a separation between said casings;
- wherein said another passage means includes a generally annular chamber between said casings and communicating with said seal means, and a pair of cross-passages in one of said casings communicating said annular chamber with the auto-ignition zone, said at least one restriction means being disposed in either cross-passage;
- said tube fitting further comprising another restriction means disposed in the other of said cross-passages for assisting in the establishment of the preselected pressure drop in the leakage flow of the flammable fluid through said another passage means; and wherein said another restriction means includes visual means operable generally from an at-rest position into a displaced position in response to the establishment of the preselected pressure drop in the leakage flow of the flammable fluid through said another passage means for indicating the occurrence of the leakage flow of the flammable fluid.

* * * * *